United States Patent
Kim

(10) Patent No.: US 6,501,881 B2
(45) Date of Patent: Dec. 31, 2002

(54) DEVICE FOR FABRICATING POLARIZATION INSENSITIVE LONG PERIOD FIBER GRATING

(75) Inventor: Se-Yoon Kim, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/917,975

(22) Filed: Jul. 30, 2001

(65) Prior Publication Data

US 2002/0031302 A1 Mar. 14, 2002

(30) Foreign Application Priority Data

Aug. 4, 2000 (KR) .............................. 00-45196

(51) Int. Cl.[7] .................................. G02B 6/34
(52) U.S. Cl. ..................... 385/37; 385/123; 385/11
(58) Field of Search ................. 385/11, 37, 123

(56) References Cited

U.S. PATENT DOCUMENTS

| | | | | |
|---|---|---|---|---|
| 5,327,515 A | * | 7/1994 | Anderson et al. | 385/123 |
| 5,550,654 A | * | 8/1996 | Erdogan et al. | 359/3 |
| 5,604,829 A | * | 2/1997 | Brusselbach | 385/37 |
| 5,881,188 A | * | 3/1999 | Starodubov | 385/37 |
| 5,912,999 A | * | 6/1999 | Brennan, III et al. | 385/37 |
| 6,204,969 B1 | * | 3/2001 | Jang | 359/570 |
| 6,370,301 B1 | * | 4/2002 | Kokura | 385/37 |
| 6,384,977 B1 | * | 5/2002 | Laming et al. | 359/570 |
| 6,414,764 B1 | * | 7/2002 | Quellette | 359/35 |
| 2001/0008466 A1 | * | 7/2001 | Kim et al. | 359/556 |

* cited by examiner

*Primary Examiner*—Brian Healy
*Assistant Examiner*—Kevin S Wood
(74) *Attorney, Agent, or Firm*—Steve Cha; Cha & Reiter

(57) ABSTRACT

Disclosed is a device for fabricating a polarization insensitive long-period fiber grating which includes: an ultraviolet laser for irradiating a ultraviolet laser beam; an ultraviolet polarizer for converting a polarization status of the ultraviolet laser beam into a linear polarization status in parallel along the longitudinal direction of a fiber; a lens for adjusting a focus of the ultraviolet laser beam from the ultraviolet polarizer; an amplitude mask for selectively passing the ultraviolet laser beam from the lens; and, a mount for holding both ends of the fiber so that the outer circumferential surface of the fiber can be exposed to the ultraviolet laser beam from the amplitude mask.

13 Claims, 5 Drawing Sheets

DEVICE FOR FABRICATING POLARIZATION INSENSITIVE LONG PERIOD FIBER GRATING

CLAIM OF PRIORITY

This application makes reference to and claims all benefits accruing under 35 U.S.C. Section 119 from an application entitled "DEVICE FOR FABRICATING POLARIZATION INSENSITIVE LONG PERIOD FIBER GRATING" filed in the Korean Industrial Property Office on Aug. 4, 2000 and there duly assigned Serial No. 2000-45196.

BACKGROUND OF THE INVENTION

1. Field of the Invention

The present invention relates generally to an optical communication, and in particular to a device for fabricating a long-period fiber grating used in an optical communication field.

2. Description of the Related Art

Long-period fiber grating devices selectively remove light at specific wavelengths by mode conversion. Long-period gratings remove light without reflection by converting it from a guided mode to a non-guided mode. A non-guided mode is a mode which is not confined to the core, but rather, is defined by the entire waveguide structure, i.e., a cladding mode. The long-period fiber grating has been used as a fiber filter, such as a non-reflecting band rejection filter and band-pass filter, an optical sensor, and a gain flattener for the erbium-doped amplifier.

A typical method for fabricating the long-period fiber grating is based on a well known principle that "germanium-doped optical fiber is photosensitive to ultraviolet light" in pp.647–649 of APPL. PHYS. Lett. Vol. 32, "Photosensitivity in optical fiber wave guides: Application to reflection filter fabrication" suggested by K. O. Hill et. al. and published in 1978.

A representative method for fabricating the long-period fiber grating is ultraviolet irradiation using "side writing" as suggested in pp.823–825 of Opt. Lett. Vol. 14, "Formation of Bragg gratings in optical fibers by transverse holographic method" by G. Meltz et. al. and published in 1989.

FIG. 1 is a structure diagram illustrating a conventional device for fabricating a long-period fiber grating. Referring to FIG. 1, the conventional device 100 for fabricating the long-period fiber grating includes a ultraviolet laser 110 for irradiating a ultraviolet laser beam, a lens 120 for adjusting a focus of the ultraviolet laser beam irradiated from the ultraviolet laser 110, an amplitude mask 130 for selectively passing the ultraviolet laser beam from the lens 120, and a fixing unit 140 for fixing both ends of a fiber (f). The positioning and orientation of amplitude mask 130 are such that when ultraviolet laser beam is transmitted therethrough, an interference pattern is formed which extends through the fiber (f). Here, the period of the grating can be adjusted by tilting amplitude mask relative to the longitudinal extend of fiber (f).

When the conventional device 100, as described in the preceding paragraph, is used to fabricate the long-period fiber grating, the ultraviolet laser beam is asymmetrically irradiated on one side of the fiber, thus the refractive index of the fiber core is anisotropically varied due to a polarization status of the ultraviolet laser beam and causes birefringence in the fiber. That is, the core of the non-birefringent fiber is substantially circular-symmetric. The circular symmetry ensures that the refractive index of the core mode is essentially insensitive to the state of optical polarization. In contrast, in hi-birefringent single mode fibers the effective refractive index of the core mode is substantially different between two principal polarization states. For background information, the birefringence due to the polarization of the ultraviolet laser beam has been disclosed in detail in a treatise of T. Erdogan, p.2100 to p.2105 of 'Journal of the optical society of America B' in 1994.

In contrast with conventional Bragg gratings, long-period gratings use a periodic spacing which is typically at least 10 times larger than the transmitted wavelength, and thus has serious variations of the refractive index due to the polarization status of the ultraviolet laser beam, namely high polarization dependence. The polarization dependence of the long-period fiber grating results in a undesirable PDL (Polarization Dependent Loss) and PMD (Polarization Mode Dispersion), thereby deteriorating the property of the long-period fiber grating as an optical communication device.

SUMMARY OF THE INVENTION

It is, therefore, the present invention relates to a device for fabricating a polarization insensitive long-period fiber grating, which can reduce the property loss due to birefringence that is resulting from the polarization status of a ultraviolet laser beam.

According to an aspect of the present invention to provide a device for fabricating a polarization insensitive long-period fiber grating, which can reduce a property loss due to birefringence that is generated when ultraviolet light is irradiated merely to one side of a fiber.

Accordingly, there is provided a device for fabricating a polarization insensitive long-period fiber grating. The device includes: an ultraviolet laser for irradiating a ultraviolet laser beam; an ultraviolet polarizer for converting a polarization status of the ultraviolet laser beam into a linear polarization status in parallel along the longitudinal direction of a fiber; a lens for adjusting a focus of the ultraviolet laser beam from the ultraviolet polarizer; an amplitude mask for selectively passing the ultraviolet laser beam from the lens; and a mount for holding both ends of the fiber such that the outer circumferential surface of the fiber can be exposed to the ultraviolet laser beam from the amplitude mask.

In another aspect of the present invention, a device for fabricating a polarization insensitive long period fiber grating includes: an ultraviolet laser for irradiating a ultraviolet laser beam; an ultraviolet polarizer for converting a polarization status of the ultraviolet laser beam into a linear polarization status in parallel along the longitudinal direction of a fiber; a lens for adjusting a focus of the ultraviolet laser beam from the ultraviolet polarizer; an amplitude mask for selectively passing the ultraviolet laser beam from the lens; a mount for holding both ends of the fiber such that the outer circumferential surface of the fiber can be exposed to the ultraviolet laser beam from the amplitude mask; and a mirror for reflecting the ultraviolet laser beam from the amplitude mask to the outer circumferential surface of the fiber.

According to another aspect of the invention, there is provided a method for passing light through an amplitude mask to create interference pattern into a fiber. The method includes the steps of: generating a ultraviolet laser beam; converting a polarization of the ultraviolet laser beam into a linear polarization in a parallel relationship with the fiber;

directing the converted ultraviolet laser beam through an amplitude mask and into the fiber, such that when the converted ultraviolet laser beam is transmitted through the amplitude mask and exposed to along the fiber, an interference is formed which extends through the fiber.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
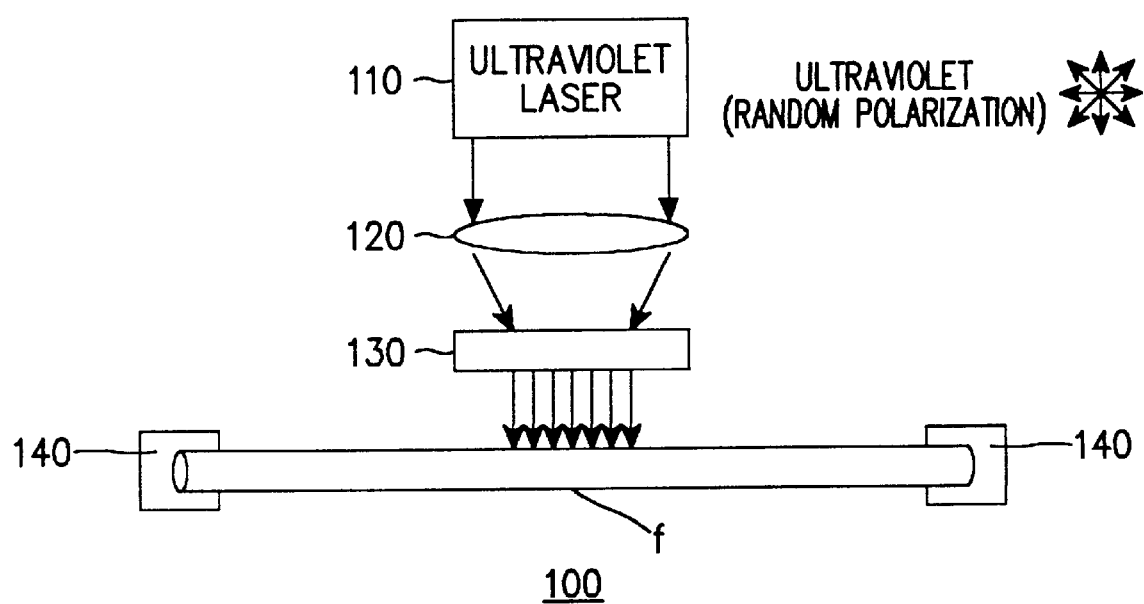
FIG. 1 is a structure diagram illustrating a conventional device for fabricating a long-period fiber grating.
Figure 2:
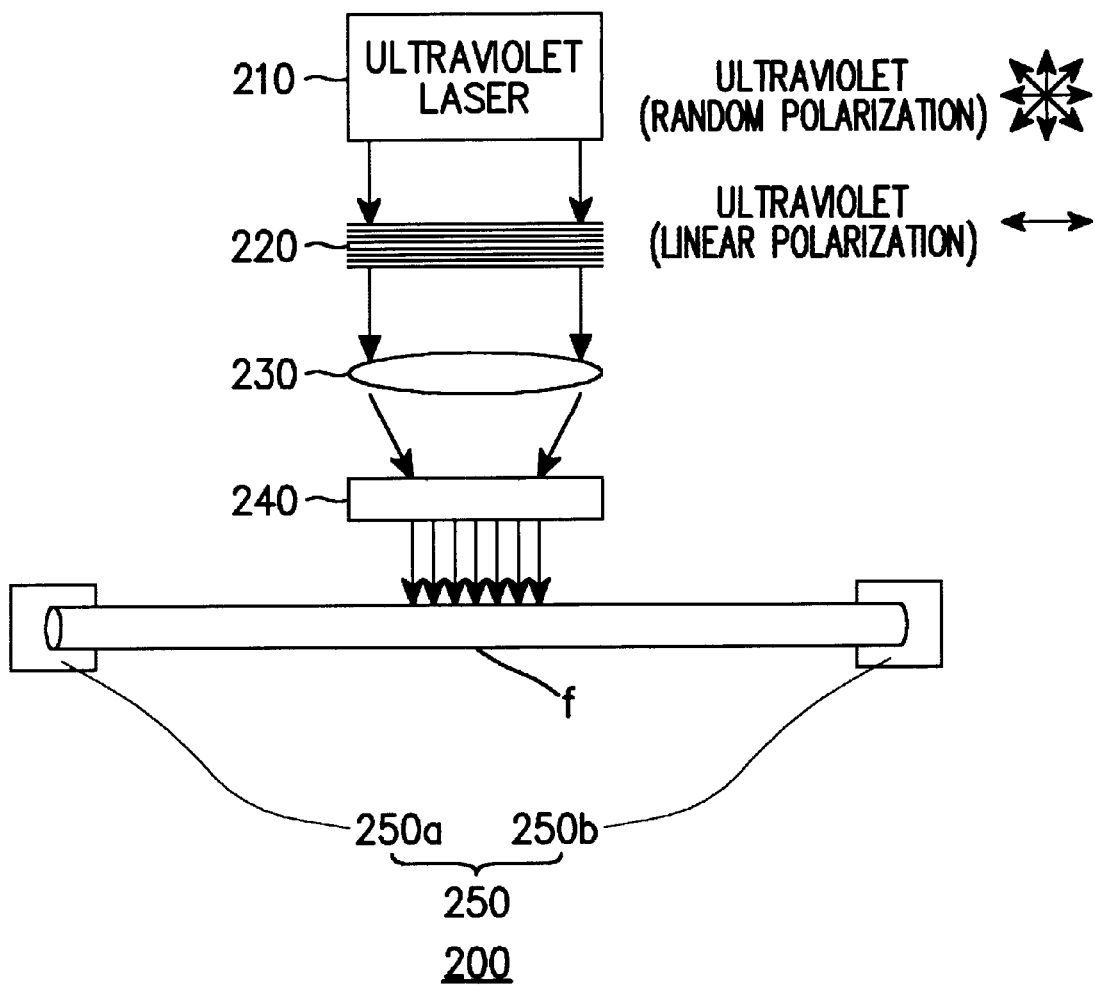
FIG. 2 is a structure diagram illustrating a device for fabricating a polarization insensitive long-period fiber grating in accordance with a first embodiment of the present invention.

FIG. 2 is a structure diagram illustrating a device for fabricating a polarization insensitive long-period fiber grating in accordance with a first embodiment of the present invention. As illustrated in FIG. 2, the device 200 for fabricating the polarization insensitive long-period fiber grating includes: a ultraviolet laser 210 for irradiating a ultraviolet laser beam; a ultraviolet polarizer 220 for converting a polarization status of the ultraviolet laser beam into a linear polarization status in parallel along the longitudinal direction of a fiber (f); a lens 230 for adjusting a focus of the ultraviolet laser beam from the ultraviolet polarizer 220, so that light is directed through an amplitude mask 240 and into core fiber (f), the amplitude mask 240 for selectively passing the ultraviolet laser beam from the lens 230, and a mount 250 having a pair of fixing units 250a, 250b for fixing both ends of the fiber (f), so that the outer circumferential surface of the fiber (f) can be exposed to the ultraviolet laser beam from the amplitude mask 240.

A key principle of the present invention lies on the principle that when the polarization status of the ultraviolet laser beam irradiated to generate variations of a refractive index of the fiber is converted into linear polarization status that is vertical to the longitudinal direction of the fiber, the birefringence is remarkably increased in the fiber. In contrast, when the polarization status of the ultraviolet laser beam is converted into linear polarization status in parallel along the longitudinal direction of the fiber, the birefringence is decreased.

Accordingly, in the present invention, the ultraviolet polarizer 220 converts the polarization status of the ultraviolet laser beam irradiated from the ultraviolet laser 210 into the linear polarization status in parallel to the longitudinal direction of the fiber (f). The ultraviolet laser beam passed through the ultraviolet polarizer 220 is irradiated on the fiber in the linear polarization status, to reduce the birefringence in the axial direction of the fiber (f).

Figure 3:
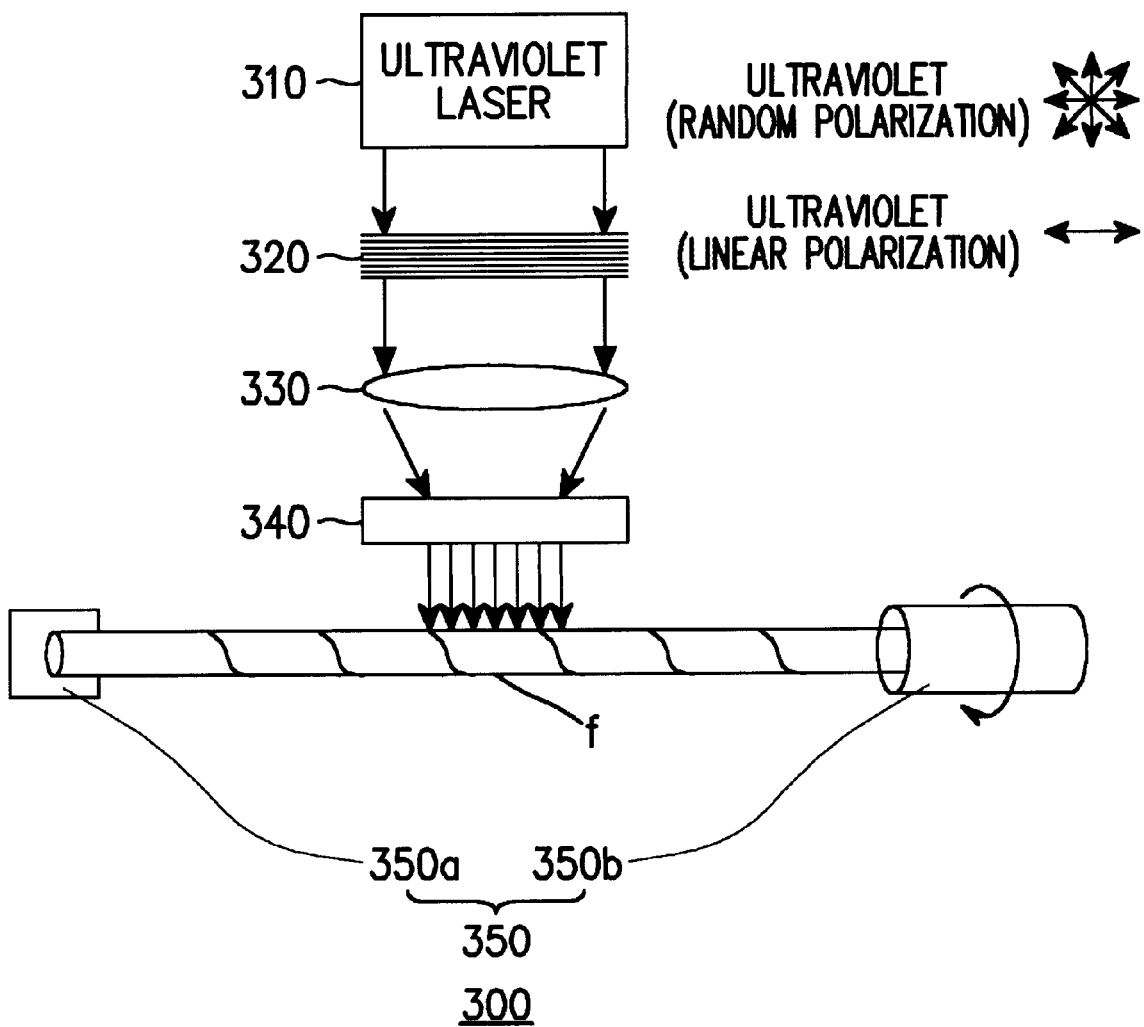
FIG. 3 is a structure diagram illustrating a device for fabricating a polarization insensitive long-period fiber grating in accordance with a second embodiment of the present invention.

FIG. 3 is a structure diagram illustrating a device for fabricating a polarization insensitive long-period fiber grating in accordance with a second embodiment of the present invention. Referring to FIG. 3, the device 300 for fabricating the polarization insensitive long-period fiber grating includes: a ultraviolet laser 310 for irradiating a ultraviolet laser beam; a ultraviolet polarizer 320 for converting a polarization status of the ultraviolet laser beam into a linear polarization status in parallel along the longitudinal direction of a fiber (f); a lens 330 for adjusting a focus of the ultraviolet laser beam from the ultraviolet polarizer 320; an amplitude mask 340 for selectively passing the ultraviolet laser beam outputted from the lens 330 onto the fiber; and a mount 350 having a fixing unit 350a for fixing one end of the fiber (f) and a twisting unit 350b for twisting the other end of the fiber (f), so that the outer circumferential surface of the fiber (f) can be exposed to the ultraviolet laser beam passing through the amplitude mask 340.

The device 300 for fabricating the polarization insensitive long-period fiber grating in accordance with the second embodiment of the present invention converts the polarization status of the ultraviolet laser beam into the linear polarization status by using the ultraviolet polarizer 320. Hence, the construction and operation of the second embodiment are essentially the same as that described above with respect to FIG. 2. The only notable difference is that one end of the fiber (f) is fixed and the other end thereof is rotated during operation. That is, the fixing unit 350a of the mount 350 fixes one end of the fiber (f), while the twisting unit 350b holding the other end of the fiber (f) is rotated by a predetermined angle when the ultraviolet laser beam is irradiated on the fiber (f) in the linear polarization status. Here, the fiber (f) is twisted to reduce the birefringence that is generated when the ultraviolet laser beam is irradiated merely to one side of the fiber (f), as in FIG. 2.

Figure 4:
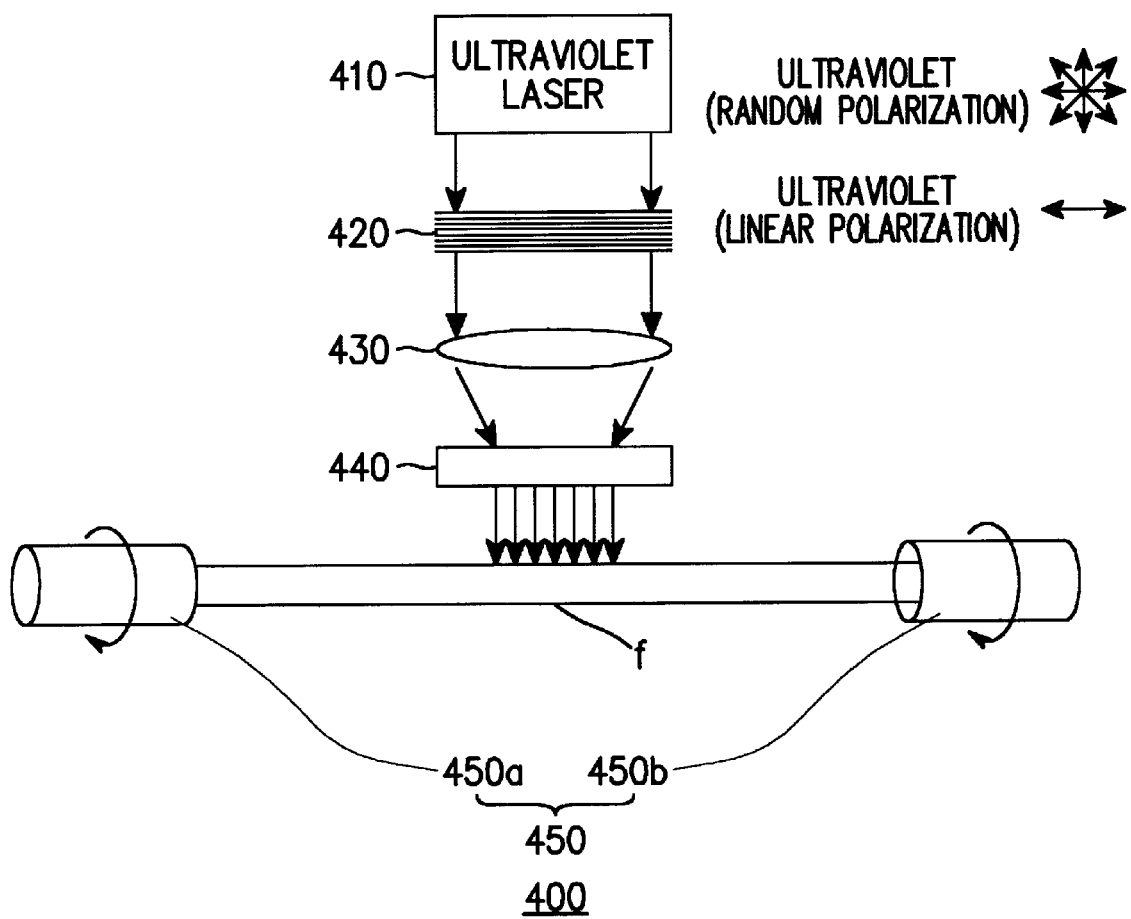
FIG. 4 is a structure diagram illustrating a device for fabricating a polarization insensitive long-period fiber grating in accordance with a third embodiment of the present invention; and, FIG. 5 is a structure diagram illustrating a device for fabricating a polarization insensitive long-period fiber grating in accordance with a fourth embodiment of the present invention.

FIG. 4 is a structure diagram illustrating a device for fabricating a polarization insensitive long-period fiber grating in accordance with a third embodiment of the present invention. As shown in FIG. 4, the device 400 for fabricating the polarization insensitive long period fiber grating includes: a ultraviolet laser 410 for irradiating a ultraviolet laser beam; a ultraviolet polarizer 420 for converting a polarization status of the ultraviolet laser beam into a linear polarization status in parallel along the longitudinal direction of a fiber (f); a lens 430 for adjusting a focus of the ultraviolet laser beam from the ultraviolet polarizer 420; an amplitude mask 440 for selectively passing the ultraviolet laser beam outputted from the lens 430; and a mount 450 having a pair of rotating units 450a, 450b for rotating both ends of the fiber (f) in a predetermined direction, so that the outer circumferential surface of the fiber (f) can be exposed to the ultraviolet laser beam passing through the amplitude mask 440.

The device 400 for fabricating the polarization insensitive long-period fiber grating in accordance with the third embodiment of the present invention converts the polarization status of the ultraviolet laser beam into the linear polarization status by using the ultraviolet polarizer 420. Thus, the construction and operation of the second embodiment are essentially the same as that described above with respect to FIG. 3. The only notable difference is that both ends of the fiber (f) are rotated simultaneously. That is, the fiber (f) mounted on both rotating units 450a, 450b of the mount 450 is rotated in uniform acceleration rate, while the ultraviolet laser beam is irradiated on the fiber (f) in the linear polarization status. Accordingly, the fiber (f) is rotated in the uniform acceleration, thus the outer circumferential surface of the fiber (f) is evenly exposed to the ultraviolet laser beam to reduce the birefringence, which results from asymmetric irradiation of the ultraviolet laser beam when the ultraviolet laser beam is irradiated merely to one side of the fiber.

Figure 5:
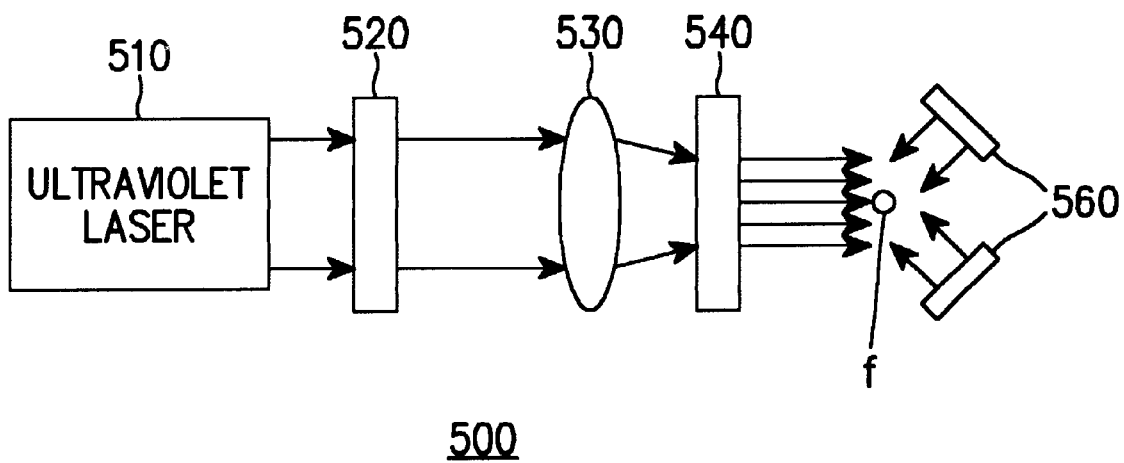

FIG. 5 is a structure diagram illustrating a device for fabricating a polarization insensitive long-period fiber grating in accordance with a fourth embodiment of the present invention. As shown in FIG. 5, the device 500 for fabricating the polarization insensitive long period fiber grating includes: a ultraviolet laser 510 for irradiating a ultraviolet laser beam; a ultraviolet polarizer 520 for converting a polarization status of the ultraviolet laser beam into a linear polarization status in parallel along the longitudinal direction of a fiber (f); a lens 530 for adjusting a focus of the ultraviolet laser beam from the ultraviolet polarizer 520; an amplitude mask 540 for selectively passing the ultraviolet laser beam from the lens 530 onto the fiber; and, at least one mirror 560 for reflecting the ultraviolet laser beam outputted from the amplitude mask 540 back to the outer-circumferential surface of the fiber (f). In addition, the device 500 for fabricating the polarization insensitive long-period fiber grating further includes a mount (not shown) for holding both ends of the fiber (f), so that the outer circumferential surface of the fiber (f) can be exposed to the ultraviolet laser beam passing through the amplitude mask 540. Hence, the fourth embodiment of the present invention further includes the mirror 560 for irradiating the ultraviolet laser beam to both sides of the fiber (f). The function of the mirror 560 reflects the ultraviolet laser beam having the linear polarization status from the amplitude mask 540 to be irradiated on the other side of the fiber (f) without rotating the fiber, thus reducing the birefringence of the fiber due to asymmetric exposure by the ultraviolet laser beam.

As described above, the device for fabricating the polarization insensitive long-period fiber grating adjusts the polarization status of the ultraviolet laser beam irradiated on the fiber in the linear polarization status, thus reducing the birefringence in the axial direction of the fiber. As a result, the property loss of the long-period fiber grating experienced in the conventional art is prevented. Moreover, the inventive device for fabricating the polarization insensitive long-period fiber grating evenly irradiates the ultraviolet laser beam to both sides of the fiber, thus decreasing the birefringence of the fiber due to the geometrical asymmetry.

The previous description of the preferred embodiments is provided to enable any person skilled in the art to make or use the present invention. The various modifications to these embodiments will be readily apparent to those skilled in the art, and other embodiments without the use of the inventive faculty. Thus, the present invention is not intended to be limited to the embodiments shown herein but is to be accorded the widest scope consistent with the principles and novel features disclosed herein.

What is claimed is:

1. A device for fabricating a polarization insensitive long-period fiber grating, comprising:
    an ultraviolet laser for irradiating a ultraviolet laser beam;
    an ultraviolet polarizer for converting a polarization status of the ultraviolet laser beam into a linear polarization status in parallel along the longitudinal direction of a fiber;
    a lens for directing the ultraviolet laser beam passing through the ultraviolet polarizer into the fiber;
    an amplitude mask for selectively passing the ultraviolet laser beam outputted from the lens onto the fiber; and,
    a mount for holding both ends of the fiber, so that the outer circumferential surface of the fiber can be exposed to the ultraviolet laser beam outputted from the amplitude mask.

2. The device according to claim 1, wherein the mount comprises a pair of fixing units for holding both ends of the fiber.

3. The device according to claim 1, wherein the mount comprises a fixing unit for fixing one end of the fiber and a twisting unit for twisting the other end of the fiber.

4. The device according to claim 1, wherein the mount comprises a pair of rotating units for rotating both ends of the fiber in a predetermined direction.

5. A device for fabricating a polarization insensitive long period fiber grating, comprising:
    an ultraviolet laser for irradiating a ultraviolet laser beam;
    an ultraviolet polarizer for converting a polarization status of the ultraviolet laser beam into a linear polarization status in parallel along the longitudinal direction of a fiber;
    a lens for directing the ultraviolet laser beam outputted from the ultraviolet polarizer into the fiber;
    an amplitude mask for selectively passing the ultraviolet laser beam outputted from the lens and into the fiber;
    a mount for holding both ends of the fiber, so that the outer circumferential surface of the fiber can be exposed to the ultraviolet laser beam outputted from the amplitude mask; and,
    a mirror for reflecting the ultraviolet laser beam outputted from the amplitude mask back to the outer circumferential surface of the fiber.

6. The device according to claim 5, wherein the mount comprises a pair of fixing units for respectively fixing both ends of the fiber.

7. The device according to claim 5, wherein the mount comprises a fixing unit for fixing one end of the fiber and a twisting unit for twisting the other end of the fiber.

8. The device according to claim 5, wherein the mount comprises a pair of rotating units for rotating both ends of the fiber in a predetermined direction.

9. A method for passing light through an amplitude mask to create an interference pattern into a fiber, the method comprising the steps of:
    generating an ultraviolet laser beam;
    converting a polarization of the ultraviolet laser beam into a linear polarization in a parallel relationship with the fiber;
    directing the converted ultraviolet laser beam through an amplitude mask and into the fiber, such that when the converted ultraviolet laser beam is transmitted through the amplitude mask and exposed to along the fiber, an interference is formed which extends through the fiber.

10. The method of claim 9, wherein the positioning and orientation of the fiber is stationery when the converted ultraviolet laser beam is transmitted through the amplitude mask.

11. The method of claim 9, further comprising the step of rotating one of the fiber at a predetermined rate when then converted ultraviolet laser beam is transmitted through the amplitude mask.

12. The method of claim 9, further comprising the step of rotating both ends of the fiber in a predetermined direction when the converted ultraviolet laser beam is transmitted through the amplitude mask.

13. The method of claim 9, further comprising the step of placing a reflective unit forreflecting the converted ultraviolet laser beam outputted from the amplitude mask back tothe unexposed surface of the fiber.

* * * * *